(12) United States Patent
Robertson et al.

(10) Patent No.: US 7,230,050 B2
(45) Date of Patent: Jun. 12, 2007

(54) TIRE COMPONENTS INCLUDING THERMOPLASTIC-ELASTOMERIC BLOCK COPOLYMERS

(75) Inventors: Christopher G. Robertson, Akron, OH (US); Terrence E. Hogan, Akron, OH (US); William L. Hergenrother, Akron, OH (US); David F. Lawson, Uniontown, OH (US)

(73) Assignee: Bridgestone Corporation, Chuo-ku, Tokyo (JP)

( * ) Notice: Subject to any disclaimer, the term of this patent is extended or adjusted under 35 U.S.C. 154(b) by 20 days.

(21) Appl. No.: 11/240,902

(22) Filed: Sep. 30, 2005

(65) Prior Publication Data

US 2006/0089447 A1 Apr. 27, 2006

Related U.S. Application Data

(60) Provisional application No. 60/615,439, filed on Oct. 2, 2004.

(51) Int. Cl.
*C08L 21/00* (2006.01)
(52) U.S. Cl. .......................... 525/95; 525/98; 525/241; 524/493; 524/496
(58) Field of Classification Search ................. 525/95, 525/98, 241, 493, 496
See application file for complete search history.

(56) References Cited

U.S. PATENT DOCUMENTS

| | | | | |
|---|---|---|---|---|
| 4,129,542 A | * | 12/1978 | Matheson et al. | ............ 524/70 |
| 5,272,207 A | | 12/1993 | Hall et al. | .................... 525/89 |
| 6,037,418 A | * | 3/2000 | Mukai et al. | ................ 525/342 |
| 6,476,131 B1 | * | 11/2002 | Hamed et al. | ................ 525/91 |

* cited by examiner

*Primary Examiner*—Robert D. Harlan
(74) *Attorney, Agent, or Firm*—Meredith E. Palmer; Arthur Reginelli

(57) ABSTRACT

A tire component comprising a vulcanized rubber, and from about 3 to about 85 parts by weight, per 100 parts by weight rubber, of a filler dispersed within said vulcanized rubber, where the vulcanized rubber includes the vulcanized residue of a thermoplastic-elastomeric block copolymer defined by the formula $$\alpha\text{-}\pi\text{-}\theta\text{-}\omega$$

where $\alpha$ is a hydrogen atom or a functional group, $\pi$ includes an elastomeric block, $\theta$ includes a thermoplastic block, and $\omega$ includes a hydrogen atom or a functional group.

26 Claims, 1 Drawing Sheet

Figure

TIRE COMPONENTS INCLUDING THERMOPLASTIC-ELASTOMERIC BLOCK COPOLYMERS

This application claims the benefit of U.S. Provisional Application No. 60/615,439, filed Oct. 2, 2004.

FIELD OF THE INVENTION

One or more embodiments of this invention are directed toward tire components that include block copolymers.

BACKGROUND OF THE INVENTION

In the art of making tires, it may be desirable to employ rubber vulcanizates that demonstrate reduced hysteresis loss, i.e., less loss of mechanical energy to heat. Hysteresis loss can be attributed to polymer free ends within the cross-linked rubber network, as well as the disassociation of filler agglomerates. The degree of dispersion of filler within the vulcanizate can also be important, as increased dispersion may provide better wear resistance.

Functionalized polymers have been employed to reduce hysteresis loss and increase bound rubber. The functional group of the functionalized polymer is believed to reduce the number of polymer free ends via interaction with filler particles. Also, this interaction may reduce filler agglomeration, which may thereby reduce hysteretic losses attributable to the disassociation of filler agglomerates (i.e., Payne effect).

Conjugated diene monomers can be anionically polymerized by using alkyllithium compounds as initiators. Selection of certain alkyllithium compounds can provide a polymer product having functionality at the head of the polymer chain. A functional group can also be attached to the tail end of an anionically-polymerized polymer by terminating a living polymer with a functionalized compound.

For example, trialkyltin chlorides, such as tributyl tin chloride, have been employed to terminate the polymerization of conjugated dienes, as well as the copolymerization of conjugated dienes and vinyl aromatic monomers, to produce polymers having a trialkyltin functionality at the tail of the polymer. Likewise, lithium salts of cyclic amines, such as lithio hexamethyleneimine, have been employed to initiate the polymerization of conjugated diene monomer to produce polymers having cyclic imines at the head of the polymer. These polymers have proven to be technologically useful in the manufacture of tire treads that are characterized by improved traction, low rolling resistance, and improved wear.

While polymers that have functionalities at both their head and tail have demonstrated the ability to provide filler-reinforced vulcanizates with many advantageous properties, the ability to process these polymers can be difficult as compared to non-functional polymers. Namely, the ability to adequately mix filler particles into the rubber compound can be problematic because it can require greater mixing energy and mixing time.

Also, anionically polymerized polymers may have a tendency to flow both during drying (hot flow) and during storage (cold flow). A common solution in the prior art to control this flow is to couple the polymers. For example, these polymers have been coupled with tin tetrachloride or silicon tetrachloride. While these coupling techniques have proven to be technologically useful, further functionalization of the polymers can be difficult.

Because polymers that provide filler-reinforced vulcanizates with reduced hysteresis loss may be important in the manufacture of tires, there is a need to for alternative approaches and improvements.

SUMMARY OF THE INVENTION

Certain embodiments of the present invention provide a tire component comprising a vulcanized rubber, and from about 3 to about 85 parts by weight, per 100 parts by weight rubber, of a filler dispersed within said vulcanized rubber, where the vulcanized rubber includes the vulcanized residue of a thermoplastic-elastomeric block copolymer defined by the formula $$\alpha\text{-}\pi\text{-}\theta\text{-}\omega$$

where $\alpha$ is a hydrogen atom or a functional group, $\pi$ includes an elastomeric block, $\theta$ includes a thermoplastic block, and $\omega$ includes a hydrogen atom or a functional group.

Certain embodiments of the present invention also include a tire component comprising a vulcanized rubber, and a filler dispersed within said vulcanized rubber, where the vulcanized rubber includes the vulcanized residue of a thermoplastic-elastomeric block copolymer that includes at least one elastomeric block and at least one thermoplastic block, where the elastomeric block is characterized by a number average molecular weight that is greater than about 10 kg/mol.

Certain embodiments of the present invention further provide a functional block copolymer defined by the formula $$\alpha\text{-}\pi\text{-}\theta\text{-}\omega$$

where $\alpha$ is a hydrogen atom or a functional group, $\pi$ is an elastomeric block, $\theta$ is a thermoplastic block, and $\omega$ is a hydrogen atom or a functional group

DETAILED DESCRIPTION OF ILLUSTRATIVE EMBODIMENTS

One or more embodiments of the present invention are directed toward thermoplastic-elastomeric block copolymers. These block copolymers may be included in the rubber portion of tire components. In other words, the block copolymer may be vulcanized and form at least a portion of the vulcanized rubber network or matrix of the tire component. The incorporation of the block copolymer may not impact the use of the conventional constituents of the tire component, and therefore the tire components of this invention may also include, for example, fillers and processing aids or extenders.

In one or more embodiments, the thermoplastic-elastomeric block copolymer (block copolymer) includes at least one elastomeric block and at least one thermoplastic block. While this may include various molecular architectures including triblocks, one or more embodiments include block copolymers that include di-blocks, i.e., copolymers that include one elastomeric block and one thermoplastic block.

The block copolymer of one or more embodiments can be defined by the formula I $$\alpha\text{-}\pi\text{-}\theta$$

where α is a hydrogen atom or a functional group, π includes an elastomeric block, and θ includes a thermoplastic block.

The term elastomeric as employed in defining the elastomeric block of the block copolymer is used in a conventional manner. In one or more embodiments, the elastomeric block may be characterized by a glass transition temperature of less than 0° C., in other embodiments less than –10° C., in other embodiments less than –20° C., and in other embodiments less than –25° C.; also, the elastomer block may be characterized by a glass transition temperature of greater than –100° C., in other embodiments greater than –90° C., in other embodiments greater than –80° C., and in other embodiments greater than –70° C.

In one or more embodiments, the elastomeric block may be large enough so that the elastomeric block can form the continuous phase of the block copolymer composition. In one embodiment, the number average molecular weight ($M_n$) of the elastomeric block can be greater than 10 kg/mol, in other embodiments greater than 50 kg/mol, in other embodiments greater than 80 kg/mol, in other embodiments greater than 100 kg/mol, and in other embodiments greater than 120 kg/mol; the number average molecular weight may be less than 1,000 kg/mol, in other embodiments less than 800 kg/mol, in other embodiments less than 600 kg/mol, and in other embodiments less than 500 kg/mol. The molecular weight distribution ($M_w/M_n$) of the elastomeric block can be less than 3, in other embodiments less than 2, in other embodiments less than 1.5, and in other embodiments less than 1.1.

The elastomeric block may include a homopolymer of one or more conjugated dienes or a copolymer of conjugated dienes or conjugated dienes and vinyl aromatics. Suitable conjugated dienes include those having from about 4 to about 12 carbon atoms such as 1,3-butadiene, 1,3-cyclohexadiene, isoprene, 1,3-pentadiene, 1,3-hexadiene, 2,3-dimethyl-1,3-butadiene, 2-ethyl-1,3-butadiene, 2-methyl-1,3 pentadiene, 3-methyl-1,3-pentadiene, 4-methyl-1,3-pentadiene, and 2,4-hexadiene. Useful vinyl aromatics include those having 8 to about 20 carbon atoms such as styrene, α-methylstyrene, p-methylstyrene, vinyl anthracene, and vinyl naphthalene.

Exemplary elastomeric homopolymers and copolymers that can be included as the elastomeric block include polyisoprene, polybutadiene, poly(styrene-co-butadiene), poly(styrene-co-isoprene), and poly(styrene-co-isoprene-co-butadiene).

In one embodiment, the elastomeric block includes a poly(styrene-co-butadiene) random copolymer. This copolymer may include a random copolymer that is characterized by less than 10%, in other embodiments less than 5%, and in other embodiments less than 1%, macro blocks of styrene as determined by oxidative decomposition. As those skilled in the art will appreciate, macro blocks include 10 or more homogeneous repeat units (e.g., 10 styrene units). In one or more embodiments, the random copolymer block includes from about 5 to about 99%, and in other embodiments from about 50 to about 90%, units deriving from butadiene, and from about 95 to about 1%, and in other embodiments from about 50 to about 10%, units deriving from styrene. The butadiene units within this random copolymer block may be characterized by including from about 8 to about 70%, and in other embodiments from about 10 to about 60%, units in the 1,2 microstructure. In one or more embodiments, where the elastomeric block includes poly(styrene-co-butadiene), the elastomeric block includes less than 40%, in other embodiments less than 35%, in other embodiments less than 25%, and in other embodiments less than 23%, on a weight basis, mer units from styrene (i.e., styrenyl units).

The term thermoplastic as employed in defining the thermoplastic block of the block copolymer is used in a conventional manner. In on or more embodiments, the thermoplastic block may be characterized by a softening temperature, as determined by ASTM D 1525, of less than 200° C., in other embodiments less than 180° C., in other embodiments less than 165° C., and in other embodiments less than 150° C.; these thermoplastic blocks may also be characterized by a softening temperature of greater than 70° C., in other embodiments greater than 80° C., and in other embodiments greater than 90° C. As those skilled in the art will appreciate, the softening temperature can be analogous to the glass transition temperature ($T_g$) for amorphous polymers and analogous to the melt temperature ($T_m$) for crystalline polymers.

The thermoplastic segment may be large enough so that it will phase separate from the elastomeric block as determined by atomic force microscopy and transmission electron microscopy. In other embodiments, the thermoplastic segment may not be too large that it becomes a continuous phase. For example, where the thermoplastic block is polystyrene, the number average molecular weight of the thermoplastic block can be greater than 5 kg/mol, in another embodiment greater than 7 kg/mol, in another embodiment greater than 10 kg/mol, and in yet another embodiment greater than 12 kg/mol; on the other hand, the number average molecular weight may be less than 100 kg/mol, in another embodiment less than 50 kg/mol, in another embodiment less than 25 kg/mol, in other embodiments less than 15 Kg/mol, and in yet other embodiments less than 10 kg/mol. Stated another way, the thermoplastic segment of the block copolymer may be less than 31%, in other embodiments less than 28%, in other embodiments less than 25%, in other embodiments less than 20% of the entire weight of the block copolymer, and in other embodiments less than 15%; also, the thermoplastic block may be greater than 1%, in other embodiments greater than 3%, in other embodiments greater than 5%, and in other embodiments greater than 10% of the entire weight of the block copolymer.

The molecular weight distribution (Mn/Mw) of the thermoplastic block may be less than 2, in another embodiment less than 1.8, in another embodiment less than 1.5, and in yet another embodiment less than 1.2.

The thermoplastic block may include homopolymers and copolymers of olefinic monomers. The composition of the thermoplastic block may be such that it is capable of separating from the elastomeric block. Useful olefinic monomers include vinyl aromatics, α-olefins and ethylene. Suitable vinyl aromatics include styrene, α-methylstyrene, vinyl toluene, vinyl naphthalene, p-butyl styrene and t-butyl styrene.

Exemplary homopolymers and copolymers that are useful as the thermoplastic block include polystyrene, poly(t-butyl styrene), polypropylene, and polyethylene.

In one or more embodiments, a includes a functional group that will react or interact with rubber fillers, such as carbon black or silica, that react or interact with rubber, or otherwise have a desirable impact on filled rubber compositions or vulcanizates.

For example, functional groups that may react or interact with carbon black include polar groups, basic groups, and highly aromatic groups. Functional groups that may react or interact with silica include basic groups and groups capable of forming hydrogen bonds, such as hydroxyl, polyalkylene glycol, epoxy, alkoxy silane, and carboxylic acid groups.

Exemplary functional groups include trialkyl tin substituents, primary, secondary, and tertiary amines, cyclic amine groups, silicon-containing groups such as alkoxy silyl groups, boron-containing compounds, isocyanatoalkoxysilane groups or sulfur-containing heterocycles. Other exemplary groups include 1,3-dimethylimidazolidinone (DMI), N-methylpyrrolidinone (NMP), carbodiimides such as dicyclohexylcarbodiimide (DCC), benzonitrile or other substituted nitriles, substituted aziridines, thiazolines, dialkylaminobenzaldehydes, bis(dialkylamino)benzophenones, substituted epoxy compounds, N-methylcaprolactam, substituted Schiff bases, substituted styrylmethyl derivatives, vinyl pyridine, short blocks of polyvinylpyridine, polysulfoxides, poly(carbodiimides), poly(meth)acrylamides, poly(aminoalkyl(meth)acrylates), polyacrylonitrile, polyethylene oxide (PEO), butyl glycidyl ether, diphenyl ethylene, functionalized styrene, monoglycidyl siloxanes, and polysiloxanes having epoxide end groups. Examples of monoglycidyl siloxanes include 3-glycidoxypropyltrimethoxysilane (GPMOS). Examples of polysiloxanes having epoxide end groups include monoglycidyl ether-terminated polysiloxanes such as monoglycidyl ether terminated poly(dimethylsiloxane).

Exemplary trialkyl tin substituents are disclosed in U.S. Pat. No. 5,268,439, which is incorporated herein by reference. Exemplary cyclic amine groups are disclosed in U.S. Pat. Nos. 6,080,853, 5,786,448, 6,025,450, and 6,046,288, which are incorporated herein by reference. Exemplary sulfur-containing heterocycles are disclosed in WO 2004/020475, which is incorporated herein by reference. Silicon-containing functional groups are disclosed in U.S. Pat. Nos. 6,008,295 and 6,228,908, where are incorporated herein by reference. Boron-containing functional groups are disclosed in U.S. application Ser. No. 11/189,891, which is incorporated herein by reference. Exemplary isocyanatoalkoxysilane groups are disclosed in U.S. Provisional Application Ser. Nos. 60/477,012 and 60/477,013, which are incorporated herein by reference. Exemplary aryl or alkyl thio acetals (e.g., dithianes) are disclosed in International Publication No. WO 2004/041870, which is incorporated herein by reference.

The block copolymers may be prepared by employing anionic, living-polymerization techniques. These techniques may include sequential polymerization whereby the elastomeric block can first be prepared followed by polymerization of the thermoplastic block. As those skilled in the art will appreciate, this sequential polymerization includes charging initiator and monomer that will give rise to the elastomeric block, and once the monomer giving rise to the elastomeric block is consumed (or consumed to a desired degree), monomer that will give rise to the thermoplastic block can subsequently be charged. In one or more embodiments, the block copolymers are not tapered.

In alternate embodiments, the thermoplastic block can first be synthesized followed by the elastomeric block. The charging order of monomer in this embodiment can be reversed. In other words, those monomer giving rise to the thermoplastic block can be initially charged with the initiator, and once this monomer is consumed to a desired degree, monomer giving rise to the elastomeric block can subsequently be added.

Anionically-polymerized, living polymers may be formed by reacting anionic initiators with certain unsaturated monomers to propagate a polymeric structure. Throughout formation and propagation of the polymer, the polymeric structure may be anionic and "living." A new batch of monomer subsequently added to the reaction can add to the living ends of the existing chains and increase the degree of polymerization. A living polymer, therefore, includes a polymeric segment having a living or reactive end. Anionic polymerization is further described in George Odian, *Principles of Polymerization*, ch. 5 ($3^{rd}$ Ed. 1991), or Panek, 94 J. Am. Chem. Soc., 8768 (1972), which are incorporated herein by reference.

Monomers that can be employed in preparing an anionically polymerized, living polymer include any monomer capable of being polymerized according to anionic polymerization techniques. For example, those monomer listed above that can be used for preparing the elastomeric or thermoplastic segment are useful.

Any anionic initiator can be employed to initiate the formation and propagation of the living polymers. Exemplary anionic initiators include, but are not limited to, alkyl lithium initiators such as n-butyl lithium, arenyllithium initiators, arenylsodium initiators, N-lithium dihydro-carbon amides, and aminoalkyllithiums.

The amount of initiator employed in conducting anionic polymerizations can vary widely based upon the desired polymer characteristics. In one embodiment, from about 0.1 to about 100 mmol, and in other embodiments from about 0.33 to about 10 mmol, of lithium per 100 g of monomer is employed.

Anionic polymerizations may be conducted in a polar solvent such as tetrahydrofuran (THF) or a nonpolar hydrocarbon such as the various cyclic and acyclic hexanes, heptanes, octanes, pentanes, their alkylated derivatives, and mixtures thereof, as well as benzene.

In order to promote randomization in copolymerization and to control vinyl content within the elastomeric segment, a polar coordinator may be added to the polymerization ingredients. Amounts may range between 0 and 90 or more equivalents per equivalent of lithium. The amount may depend on the amount of vinyl desired, the level of styrene employed and the temperature of the polymerization, as well as the nature of the specific polar coordinator (modifier) employed. Suitable polymerization modifiers include, for example, ethers or amines to provide the desired microstructure and randomization of the comonomer units.

Compounds useful as polar coordinators include those having an oxygen or nitrogen heteroatom and a non-bonded pair of electrons. Examples include dialkyl ethers of mono and oligo alkylene glycols; "crown" ethers; tertiary amines such as tetramethylethylene diamine (TMEDA); linear THF oligomers; and the like. Examples of compounds useful as polar coordinators include tetrahydrofuran (THF), linear and cyclic oligomeric oxolanyl alkanes such as 2,2-bis(2'-tetrahydrofuryl)propane, di-piperidyl ethane, dipiperidyl methane, hexamethylphosphoramide, N-N'-dimethylpiperazine, diazabicyclooctane, dimethyl ether, diethyl ether, tributylamine and the like. Linear and cyclic oligomeric oxolanyl alkane modifiers are described in U.S. Pat. No. 4,429,091, incorporated herein by reference.

Anionically polymerized living polymers can be prepared by either batch or continuous methods. A batch polymerization may be begun by charging a blend of monomer(s) and solvent to a suitable reaction vessel, followed by the addition of the polar coordinator (if employed) and an initiator compound. The reactants can be heated to a temperature of from about 20° C. to about 130° C. and the polymerization may be allowed to proceed for from about 0.1 to about 24 hours. This reaction may produce a reactive polymer having a reactive or living end. In one or more embodiments, at least about 30% of the polymer molecules contain a living end, in other embodiments at least about 50% of the polymer molecules contain a living end, and in other embodiments at least about 80% contain a living end. Continuous processes are known as described, for example, in U.S. Pat. Nos. 5,231,152, 5,272,207, 5,489,660, 5,891,947, and 6,313,232, which are incorporated herein by reference.

After formation and termination or quenching of the block copolymer, a processing aid and/or other optional additives such as oil can be added to the polymer cement. The block copolymer and other optional ingredients may then be isolated from the solvent and optionally dried. Conventional procedures for desolventization and drying may be employed. In one embodiment, the block copolymer may be isolated from the solvent by steam desolventization or hot water coagulation of the solvent followed by filtration. Residual solvent may be removed by using conventional drying techniques such as oven drying or drum drying. Alternatively, the cement may be directly drum dried.

As described above, α may be a functional group that can be attached to the elastomeric block. In one embodiment, where the elastomeric block is the first block synthesized in the sequential polymerization process, the functional group α may result from or is the residue of a functionalized initiator. Methods for preparing "head-functionalized" polymers by initiating polymerization with a functionalized initiator are known. For example, functionalized initiators include alkyl tin lithiums, N-lithiohexamethyleneimide, N-lithiopyrrolidinide, and N-lithiododecamethyleneimide as well as organolithium compounds such as the tri-alkyl lithium adducts of substituted aldimines and substituted ketimines, and N-lithio salts of substituted secondary amines. Exemplary initiators are also described in the following U.S. Pat. Nos. 5,332,810, 5,329,005, 5,578,542, 5,393,721, 5,698,646, 5,491,230, 5,521,309, 5,496,940, 5,574,109, 5,786,441, and International Publication No. WO 2004/020475, which are incorporated herein by reference.

In another embodiment, where the elastomeric block is the second or final block prepared in the sequential polymerization process, the functional group α may result from or is the residue of a functionalized terminating agent. Methods for preparing "tail-functionalized" polymers by terminating an anionic polymerization with a functionalized terminator are known.

In one or more embodiments, the presence of the thermoplastic block can improve the cold flow characteristics of the elastomeric block to which it is attached. Despite the improvement in cold flow characteristics, which may be indicated by increased viscosity, the processability of the block copolymer may not be deleteriously compromised. For example, the block copolymers of one or more embodiments may be advantageously processable under conventional tire compound conditions and yet exhibit sufficient resistance to cold flow to allow for technologically useful storage and transportation.

In yet another embodiment, the copolymer includes a thermoplastic-elastomeric block copolymer that includes a functional group attached to the thermoplastic block. In certain embodiments, the combination of the thermoplastic segment together with the functional group attached to the thermoplastic segment may result in a reduction in hysteresis loss of tire treads that include these copolymers. Also, because the functional group can be attached to the thermoplastic block polymer, processing may be improved in one or more embodiments. Particularly, interaction or reaction between the functional group and filler particles within a rubber formulation can be delayed when the functional group is attached to the thermoplastic block. It is believed that this result may derive from some form of shielding or masking of the functional group by the thermoplastic segment. This delay or interaction can be advantageous because it can provide the ability to more thoroughly mix the rubber and filler (which thereby reduces polymer agglomerates) and then subsequently allow the functional group to react with the filler while the filler is in an enhanced mixed state. It is believed that the functional group may be entrapped within the glassy domains of the thermoplastic block at temperatures below the transition temperature of the block. As the temperature of the composition increases beyond the glass transition temperature of the thermoplastic block, the thermoplastic block can begin to flow and the functional group can migrate toward the elastomeric phase and/or toward the filler particles. While polymer processing, particularly rubber mixing with filler, may occur at temperatures above the glass transition temperature of most thermoplastic blocks, and because the block copolymer can be initially added to the mixer while the thermoplastic block is in its glassy state, and because time may be required to allow the energy present during mixing to cause the thermoplastic block to flow, there may nonetheless be an advantageous delay in the migration of functional group.

As with the previous embodiments, the functionalized block copolymer may be vulcanized and may form at least a portion of the vulcanized rubber network or matrix of the tire component. The incorporation of the functionalized block copolymer may not impact the use of the conventional constituents of the tire component, and therefore the tire components of this invention may also include, for example, fillers, processing aids, or extenders.

The functionalized block copolymer of this embodiment may include at least one elastomeric block, at least one thermoplastic block, and a functional group attached to the thermoplastic block. While this may include various molecular architectures including triblocks or other multiblock copolymers, in one or more embodiments the block copolymers include diblocks that include one elastomeric block, one thermoplastic block, and a functional group attached to the terminal end of the thermoplastic block.

The functionalized block copolymer of this embodiment can be defined by the formula II $$\alpha\text{-}\pi\text{-}\theta\text{-}\omega$$

where α is a hydrogen atom or a functional group, π includes an elastomeric block, θ includes a thermoplastic block, and ω includes a hydrogen atom or a functional group.

The term elastomeric is employed in the same fashion as it is with respect to the embodiments disclosed above.

The elastomeric block of the functionalized block copolymer of this embodiment can be large enough so that the elastomeric block can form the continuous phase of the block copolymer composition. In one embodiment, the number average molecular weight ($M_n$) of the elastomeric block can be greater than 10 kg/mol, in another embodiment greater than 50 kg/mol, in another embodiment greater than 80 kg/mol, in another embodiment greater than 100 kg/mol, and in yet another embodiment greater than 120 kg/mol; in one embodiment the number average molecular weight can be less than 1,000 kg/mol, in another embodiment less than 800 kg/mol, in another embodiment less than 600 kg/mol, and in yet another embodiment less than 500 kg/mol. In one embodiment, the molecular weight distribution ($M_w/M_n$) of the elastomeric block can be less than 3, in another embodiment less than 2, in another embodiment less than 1.5, and in yet another embodiment less than 1.1.

The elastomeric block of the functionalized block copolymer of this embodiment may include a homopolymer of one or more conjugated dienes or a copolymer of conjugated dienes or conjugated dienes and vinyl aromatics. Suitable conjugated dienes include those having from about 4 to about 12 carbon atoms such as 1,3-butadiene, 1,3-cyclohexadiene, isoprene, 1,3-pentadiene, 1,3-hexadiene, 2,3-dimethyl-1,3-butadiene, 2-ethyl-1,3-butadiene, 2-methyl-1,3 pentadiene, 3-methyl-1,3-pentadiene, 4-methyl-1,3-pentadiene, and 2,4-hexadiene. Useful vinyl aromatics include those having 8 to about 20 carbon atoms such as styrene, α-methylstyrene, p-methylstyrene, vinyl anthracene, and vinyl naphthalene.

Exemplary elastomeric homopolymers and copolymers that can be included as the thermoplastic block include polyisoprene, polybutadiene, poly(styrene-co-butadiene), poly(styrene-co-isoprene), and poly(styrene-co-isoprene-co-butadiene).

The microstructure can be similar to that described with respect to the embodiments discussed above.

Likewise, the term thermoplastic may be employed in the same fashion as it is with respect to the embodiments disclosed above.

The thermoplastic segment of the functionalized block copolymer of this embodiment can be large enough so that it will phase separate from the elastomeric block as determined by atomic force microscopy and transmission electron microscopy. On the other hand, the thermoplastic segment may not be too large that it becomes a continuous phase. For example, where the thermoplastic block is polystyrene, the number average molecular weight of the thermoplastic block can be greater than 5 kg/mol, in another embodiment greater than 7 kg/mol, in another embodiment greater than 10 kg/mol, and in yet another embodiment greater than 12 kg/mol; on the other hand, in one embodiment the number average molecular weight is less than 100 kg/mol, in another embodiment less than 80 kg/mol, in another embodiment less than 50 kg/mol, and in yet another embodiment less than 30 kg/mol. Stated another way, in one embodiment, the thermoplastic segment of the block copolymer can be less than 31%, in another embodiment less than 28%, in another embodiment less than 25%, and in yet another embodiment less than 20% of the entire weight of the block copolymer; also, in one embodiment the thermoplastic block can be greater than 1%, in another embodiment greater than 3%, in another embodiment greater than 5%, and in yet another embodiment greater than 10% of the entire weight of the block copolymer.

The molecular weight distribution (Mn/Mw) of the thermoplastic block of this copolymer can be less than 2, in other embodiments less than 1.8, in other embodiments less than 1.5, and in other embodiments less than 1.2.

The thermoplastic block may include homopolymers and copolymers of olefinic monomers. The composition of the thermoplastic block can be such that it is capable of phase separating from the elastomeric block. Useful olefinic monomers include vinyl aromatics, α-olefins and ethylene. Suitable vinyl aromatics include styrene, α-methylstyrene, vinyl toluene, vinyl naphthalene, p-butyl styrene and t-butyl styrene.

Exemplary homopolymers and copolymers that are useful as the elastomeric block include polystyrene, poly(t-butyl styrene), polypropylene, and polyethylene.

In one or more embodiments, the functional group ω, as well as the functional group α in those embodiments where α is a functional group, include groups that can react or interact with rubber fillers, such as carbon black or silica, that will react or interact with rubber or rubber fillers, or that otherwise have a desirable impact on filled rubber compositions or vulcanizates. Useful functional groups (e.g., α and ω) include those disclosed above with respect to the embodiments disclosed above.

The functionalized block copolymers of this embodiment can be synthesized in a similar manner to those block copolymers prepared in the embodiments disclosed above. In particular, known anionic, living polymerization techniques may be used. As those skilled in the art will appreciate, the ω functional group (as well as the α functional group) can be added to the polymer by employing a functionalized initiator or by employing a functionalized terminator. Those skilled in the art will also understand the appropriate order of addition of the reagents during the living polymerization. For example, if the functional group ω derives from a functionalized initiator, then the thermoplastic block can be the block that is first synthesized so that the ω functional group can be positioned at the end of the thermoplastic block or segment. On the other hand, if the functional group ω derives from a functionalized terminating agent, then the thermoplastic segment can be formed subsequent to formation of the elastomeric segment, and polymerization of the thermoplastic segment can be terminated with the functionalized terminator to thereby position the functional group at the end of the thermoplastic block or segment.

Once the functionalized block copolymer is formed, the block copolymer can be "prepped" and/or isolated by employing conventional procedures including those disclosed above with respect to the first embodiment.

In certain embodiments, the copolymers can be mixed or blended with compounds that may serve to alter the softening temperature (e.g., the glass transition temperature or melt temperature) of the thermoplastic segment. For example, where the thermoplastic segment includes polystyrene, poly(2,6-dimethyl-1,4phenylene oxide) (PPO) can be mixed or blended with the block copolymer. It is believed that this compound can migrate to the glassy or hard domain formed by the thermoplastic segment and increase the glass transition temperature thereof. In one or more embodiments, the PPO can be alloyed with the domains of the thermoplastic block; this can occur via solution or thermal blending. Compounds such as the poly(2,6-dimethyl-1,4-phenylene oxide) can be added or mixed with the block copolymer while the block copolymer is in solution (e.g., prior to drying) or by way of solid-state mixing. For example, solid-state mixing may include melt mixing within an extruder. Alternatively, solid-state mixing may include mixing or blending within a batch mixer such as a Brabender or Banbury mixer. The PPO can be blended with the copolymer to form a masterbatch that can be added to the tire compound. The use of PPO is, however, optional and therefore certain embodiments of this invention are devoid of PPO or other constituents that can alter the softening point of the thermoplastic segment.

In addition to the block copolymers of the above embodiments, the tire components of this invention can include or be prepared by employing additional elastomeric polymers or copolymers. These additional polymers and copolymers include those that are conventional in the art such as natural and synthetic elastomers. The synthetic elastomers may derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly (styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that may be employed in rubber compounding may also be added.

The fillers that can be employed include those fillers that are conventionally employed in the manufacture of tires. Useful fillers include inorganic and organic fillers. The organic fillers include carbon black and starch. The inorganic fillers may include silica, aluminum hydroxide, magnesium hydroxide, clays (hydrated aluminum silicates), and mixtures thereof.

Useful processing or extender oils include those that are conventionally employed in the manufacture of polymers or tire compositions. Preferred oils include those that are commercially available as paraffinic, aromatic, or naphthenic oils. In one or more embodiments, the major constituent of the oil is paraffinic. In one embodiment, these oils include those low in polycyclic aromatic content such as "black oil." In one or more embodiments, the oils include those that will not plasticize or soften the thermoplastic domains or blocks of the block copolymer at temperatures where these glassy or hard domains may be advantageous.

The tire components may also include other additives that are conventionally employed in the manufacture of tires. These components or constituents include waxes, scorch inhibiting agents, processing aids, zinc oxide, tackifying resins, reinforcing resins, fatty acids such as stearic acid, peptizers, and one or more additional rubbers.

In a conventional manner, the tire components of this invention include an elastomeric or polymeric component. This elastomeric or polymeric component may include in excess of 1% by weight, in other embodiments an excess of 20% by weight, in other embodiments an excess of 30% by weight, in yet another embodiment an excess of 50% by weight, in still another embodiment an excess of 70% by weight, in another embodiment an excess of 90%, and yet another embodiment an excess of 99% by weight of the block copolymer of one or more embodiments of this invention. In one embodiment, the one or more of the block copolymers disclosed herein constitute substantially all of the elastomeric component of the tire component. In those embodiments where the block copolymer does not constitute all of the polymer or elastomeric component, the balance may include other elastomers disclosed above.

The tire components may include at least 3 parts by weight, in other embodiments at least 5 parts by weight, in other embodiments at least 12 parts by weight, and in other embodiments at least 25 parts by weight filler per 100 parts by weight rubber (i.e., the elastomeric component); and the tire components may include less than 120 parts by weight, in other embodiments less than 100 parts by weight, in other embodiments less than 85 parts by weight, in other embodiments less than 70 parts by weight, in other embodiments less than 50 parts by weight, and in other embodiments less than 45 parts by weight filler per 100 parts by weight rubber. Where carbon black and silica are employed in combination, the weight ratio of carbon black to silica can be from about 1:99 to about 99:1, in other embodiments from about 1:50 to about 50:1, in other embodiments from about 1:25 to about 25:1, and in other embodiments from about 1:5 to about 5:1.

The tire components may also include from about 0 to about 80, in other embodiments from about 5 to about 50, and in other embodiments from about 10 to about 30 parts by weight processing or extender oil per 100 parts by weight rubber.

Where poly(2,6-dimethyl-1,4phenylene oxide) is added to the block copolymer or the tire formulations that include the block copolymer, the amount of poly(2,6-dimethyl-1,4-phenylene oxide) may be a function of the block styrene content of the block copolymer. In one embodiment, the poly(2,6-dimethyl-1,4-phenylene oxide) can be added in an amount from about 0.1 to about 4 parts by weight, in other embodiments from about 0.1 to about 3 parts by weight, and in other embodiments from 1 to about 2 parts by weight poly(2,6-dimethyl-1,4-phenylene oxide) per part by weight block styrene.

The inclusion of the block copolymers of one or more embodiments disclosed herein does not necessarily impact the procedures that would normally or conventionally be employed in the manufacture of tire components. That is, the block copolymers can simply be included into a tire formulation in lieu of or together with other elastomers in a manner that is conventional in the art.

A vulcanizable rubber composition can be prepared by forming an initial masterbatch that includes the rubber component and filler. This initial masterbatch can be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents can be introduced and blended into the initial masterbatch at low temperatures in a final mix stage, which does not initiate the vulcanization process. Optionally, additional mixing stages, sometimes called remills, can be employed between the masterbatch mix stage and the final mix stage. Rubber compounding techniques and the additives employed therein are generally known as disclosed in Stephens, *The Compounding and Vulcanization of Rubber*, in *Rubber Technology* ($2^{nd}$ Ed. 1973). More elaborate procedures are often employed when the filler includes silica and the polymer includes a functional group that will react with silica or a silica coupling agent is used. Specifically, the mixing temperature can be maintained at low temperatures where the silica coupling agent is used so as to reduce reaction between the silica coupling agent and silica filler. Therefore, high temperature mixing can be accomplished in the absence of the silica coupling agent. The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference.

These vulcanizable rubber compositions can then be processed into tire components according to ordinary tire manufacturing techniques including standard rubber shaping, molding and curing techniques. Vulcanization can be effected by heating the vulcanizable composition in a mold; e.g., it is heated to about 140 to about 180° C. A multitude of rubber curing agents may be employed, including sulfur or peroxide-based curing systems. Curing agents are described in *Kirk-Othmer, Encyclopedia of Chemical Technology*, 365–468, ($3^{rd}$ Ed. 1982), particularly *Vulcanization Agents and Auxiliary Materials*, 390–402, and A. Y. Coran, *Vulcanization in Encyclopedia of Polymer Science and Engineering*, ($2^{nd}$ Ed. 1989), which are incorporated herein by reference. Vulcanizing agents may be used alone or in combination. Cured or crosslinked rubber compositions may be referred to as vulcanizates, which generally contain three-dimensional polymeric networks that are thermoset. The other ingredients, such as processing aides and fillers, can be evenly dispersed throughout the vulcanized network. Pneumatic tires can be made as discussed in U.S. Pat. Nos. 5,866,171, 5,876,527, 5,931,211, and 5,971,046, which are incorporated herein by reference.

The resultant tire component may include a vulcanized crosslinked elastomeric network or matrix. Because the block copolymers include unsaturation within the elastomeric block, the elastomeric block of the block copolymer can, upon vulcanization, become part of this network. In other words, the vulcanized rubber may include the residue (i.e., vulcanized reaction product) of the block copolymers. While the thermoplastic block of the block copolymer is not believed to directly take part in a crosslinking reaction with the elastomeric block or other elastomers within the formulation, the thermoplastic block may nonetheless be part of the network as an inherent result of its attachment to the elastomeric block. Furthermore, it is believed that the difference in the glass transition temperature between the elastomeric block and the thermoplastic block can cause the thermoplastic block to be phase separated from the elastomeric block at certain temperatures. Because the ability to phase separate the elastomeric block from the thermoplastic block (and more specifically phase separate the thermoplastic block from the vulcanized elastomeric network) may be a function of temperature, one can select certain thermoplastic blocks to provide desired properties at various temperature. For example, where the thermoplastic block is a polystyrene block, it is believed that the polystyrene block will phase separate into hard domains (e.g., glassy or crystalline) up to temperatures of about 100° C. Above this temperature, the polystyrene blocks are believed to flow and potentially become more mixable with the elastomeric phase. This can be advantageous inasmuch as tire formulations are often mixed at temperatures in excess of 170° C., and therefore it is believed that the polystyrenic thermoplastic block will more easily be mixed with the other components of the tire formulation. On the other hand, because the operating temperatures of tire components is often below about 70° C., it is believed that the styrenic thermoplastic blocks will exist in the form of hard or glassy domains that can contribute to advantageous properties of the tire component such as reduced hysteretic loss. This can be especially advantageous where the tire component is the tire tread.

In one or more embodiments, the tire components of this invention include treads. Other tire components that may benefit from practice of this invention include subtreads, sidewalls, body ply skins, bead fillers, and belt wedges.

In order to demonstrate the practice of the present invention, the following examples have been prepared and tested. The examples should not, however, be viewed as limiting the scope of the invention. The claims will serve to define the invention.

EXAMPLES

Example 1

Experiment 1

Eight polymers were prepared and mixed into tire formulations. The tire formulations were extruded and cured, and the resulting vulcanizates were tested for various mechanical and dynamic properties. Table I identifies the various polymers based upon ingredients that were employed in their preparation, as well as characteristics of the polymers. Table I also provides the results of the mechanical and dynamic tests that were performed on the vulcanizates.

Specifically, the polymers were prepared by employing batch anionic polymerization techniques. Polymer Samples 1–4 included poly(styrene-co-butadiene) random copolymers, and Samples 5–8 included block copolymers that included a poly(styrene-co-butadiene) random copolymer segment and a polystyrene segment. The block copolymers were prepared by sequential anionic polymerization whereby the random copolymer segment was first prepared, and after sufficient depletion of the available monomer, a charge of styrene monomer was added in order to sequentially polymerize the polystyrene segment. All of the polymers were prepared in technical hexanes using n-butyllithium as an initiator. The random copolymers or random copolymer segments were prepared in the presence of 2,2'-di(tetrahydrofuryl)propane, which served as a randomizer. The weight ratio of the styrene to the butadiene within the random copolymer or copolymer segment was about 20:80. Each of the polymerization were terminated with isopropyl alcohol.

The tire formulations into which the polymers were mixed included 100 parts by weight of the sample polymer, 41 parts by weight carbon black (N343) phr, 10.5 parts by weight aromatic oil phr, 2 parts by weight stearic acid phr, 1 parts by weight wax phr, 2.5 parts by weight zinc oxide phr, and 0.95 parts by weight antioxidant phr. These ingredients were mixed within a 65 g (Brabender Mixer) at 50 rpm until an integrated torque (mixing energy) of 77 N-m-min was reached. The drop temperature was about 162°–164° C. Following this mixing, 1.3 parts by weight sulfur, 0.2 parts by weight diphenyl guanidine accelerator, and 1.7 parts by weight CBS accelerator were added to the mixture, and mixing was continued at 40 rpm until an integrated torque of 77 N-m-min was reached with a drop temperature of 82°–89° C. The formulations were then formed into extrudates and cured for 15 min at 171° C. These vulcanizates were then subjected to the following mechanical and dynamic tests.

Mooney viscosity measurement was conducted at 130° C. using a large rotor. The Mooney viscosity was recorded as the torque when the rotor has rotated for 4 minutes. The sample is preheated at 130° C. for 1 minute before the rotor starts.

The bound rubber content test was used to determine the percent of polymer bound to filler particles in tire tread stocks. Bound rubber was measured by immersing small pieces of uncured stocks in a large excess of toluene for three days. The soluble rubber was extracted from the sample by the solvent. After three days, any excess toluene was drained off and the sample was air dried and then dried in an oven at approximately 100° C. to a constant weight. The remaining pieces form a weak coherent gel containing the filler and some of the original rubber. The amount of rubber remaining with the filler is the bound rubber. The bound rubber content is then calculated according to the following:

$$\% \text{ Bound Polymer} = \frac{100(W_d - F)}{R} \qquad (1)$$

where $W_d$ is the weight of dried gel, F is the weight of filler in gel or solvent insoluble matter (same as weight of filler in original sample), and R is the weight of polymer in original sample.

The tensile mechanical properties were measured using the standard procedure described in the ASTM-D 412 at 25° C. and 100° C. The tensile test specimens had dumbbell shapes with a thickness of 1.9 mm. A specific gauge length of 25.4 mm is used for the tensile test.

Temperature sweep experiments were conducted with a frequency of 31.4 rad/sec using 0.5 % strain for temperature ranging from –100° C. to –10° C., and 2% strain for the temperature ranging from –10° C. to 100° C. ΔG' is the change in G' at 0.25% compared to G' at 14.75%. Payne effect (ΔG') data were obtained from the strain sweep experiment. A frequency of 3.14 rad/sec was used for strain sweep which is conducted at 50° C. with strain sweeping from 0.25% to 14.00%.

TABLE I

| | Example | | | | | | | |
|---|---|---|---|---|---|---|---|---|
| | 1 | 2 | 3 | 4 | 5 | 6 | 7 | 8 |
| Polymer type: | SBR | SBR | SBR | SBR | SBR-b-PS | SBR-b-PS | SBR-b-PS | SBR-b-PS |
| 1.54 M Butyllithium (ml): | 4.42 | 2.95 | 2.21 | 1.47 | 4.42 | 2.95 | 2.21 | 1.47 |
| 1.6 M 2,2'-di(tetrahydrofuryl)propane (ml): | 1.10 | 0.88 | 0.66 | 0.44 | 1.10 | 0.88 | 0.66 | 0.44 |
| 33% Styrene in hexanes (kg): | n/a | n/a | n/a | n/a | 0.20 | 0.14 | 0.10 | 0.07 |
| Theoretical PS Block Length (kg/mol): | n/a | n/a | n/a | n/a | 10 | 10 | 10 | 10 |
| $M_w$ (kg/mol): | 95.8 | 139.5 | 204.2 | 388.9 | 101.7 | 150.9 | 222.5 | 300.4 |
| $M_w/M_n$: | 1.03 | 1.03 | 1.05 | 1.11 | 1.05 | 1.05 | 1.07 | 1.10 |
| $T_g$ (° C.): | −34.8 | −34.1 | −35.0 | −33.9 | −34.3 | −35.5 | −35.4 | −37.6 |
| 171° C. Cure Rheometer t50 (min): | 3.8 | 3.8 | 4.1 | 4.0 | 4.4 | 3.9 | 3.7 | 3.4 |
| 171° C. Cure Rheometer MH–ML (kg-cm): | 12.7 | 12.9 | 14.4 | 14.0 | 11.3 | 13.7 | 15.3 | 14.3 |
| $ML_{1+4}$ @ 130° C.: | 6.3 | 16.0 | 39.0 | 90.2 | 11.9 | 26.6 | 49.6 | 94.6 |
| 300% Modulus @ 23° C. (MPa): | 5.11 | 6.29 | 7.27 | 7.28 | 7.73 | 8.30 | 8.54 | 8.15 |
| Tensile Break Stress @ 23° C. (MPa): | 11.5 | 14.6 | 16.0 | 16.1 | 13.1 | 14.8 | 15.4 | 16.9 |
| Elongation at Break @ 23° C. (%): | 540 | 529 | 506 | 490 | 464 | 462 | 450 | 486 |
| 200% Modulus @ 100° C. (MPa): | 2.13 | 2.71 | 3.27 | 3.27 | 2.60 | 3.25 | 3.76 | 3.58 |
| Tensile Break Stress @ 100° C. (MPa): | 4.03 | 4.38 | 5.25 | 4.50 | 4.57 | 5.08 | 5.45 | 6.62 |
| Elongation at Break @ 100° C. (%): | 316 | 278 | 276 | 244 | 297 | 271 | 254 | 295 |
| tan δ [torsion strip; 0° C.; 5 Hz, 2%]: | 0.335 | 0.346 | 0.354 | 0.345 | 0.406 | 0.398 | 0.428 | 0.394 |
| tan δ [torsion strip; 50° C.; 5 Hz, 2%]: | 0.248 | 0.218 | 0.191 | 0.137 | 0.203 | 0.181 | 0.169 | 0.132 |
| G'(MPa) [torsion strip; 50° C.; 5 Hz, 2%]: | 3.81 | 3.20 | 3.73 | 3.18 | 4.94 | 4.73 | 3.88 | 3.53 |
| ΔG' (MPa) [torsion button; 50° C.; 1 Hz; 0.25%–15%]: | 2.14 | 2.05 | 1.80 | 0.95 | 1.64 | 1.32 | 1.25 | 0.97 |
| tan δ [torsion button; 50° C.; 1 Hz, 5%]: | 0.260 | 0.212 | 0.177 | 0.117 | 0.191 | 0.178 | 0.153 | 0.115 |

Experiment 2

Four additional polymers were prepared in a similar fashion to that described in Experiment 1. Sample 9 included a poly(styrene-co-butadiene) random copolymer, and Samples 10–12 included block copolymers including a random poly(styrene-co-butadiene) segment and a polystyrene segment. The size of the polystyrene segment of each of these block copolymers was varied as indicated in Table I.

Table II provides the defining ingredients that were employed in each sample, the defining characteristics of the polymers, and the results of physical and dynamic tests that were performed on vulcanizates that were prepared employing the polymer. The formulations that gave rise to the vulcanizates were similar to those prepared in Experiment 1 except that aromatic oil was replaced with aliphatic oil.

TABLE II

| | Example | | | |
|---|---|---|---|---|
| | 9 | 10 | 11 | 12 |
| Polymer type: | SBR | SBR-b-PS | SBR-b-PS | SBR-b-PS |
| 1.54 M Butyllithium (ml): | 3.68 | 3.68 | 3.68 | 3.68 |
| 1.6 M 2,2'-di(tetrahydrofuryl)propane (ml): | 1.03 | 1.03 | 1.03 | 1.03 |
| 33% Styrene in hexanes (kg): | n/a | 0.13 | 0.29 | 0.37 |
| Theoretical PS Block Length (kg/mol): | n/a | 10 | 30 | 50 |
| $M_w$ (kg/mol): | 103.2 | 112.2 | 124.9 | 141.3 |
| $M_w/M_n$: | 1.03 | 1.03 | 1.03 | 1.06 |
| $T_g$ (° C.): | −32.6 | −32.6 | −32.6 | −32.6 |
| 171° C. Cure Rheometer t50 (min): | 3.5 | 3.9 | 4.4 | 4.9 |
| 171° C. Cure Rheometer MH-ML (kg-cm): | 13.1 | 9.8 | 8.8 | 8.5 |
| $ML_{1+4}$ @ 130° C.: | 8.8 | 23.0 | 57.8 | 59.1 |
| 300% Modulus @ 23° C. (MPa): | 7.18 | 9.33 | 14.15 | |
| Tensile Break Stress @ 23° C. (MPa): | 12.7 | 15.0 | 16.2 | 12.8 |
| Elongation at Break @ 23° C. (%): | 449 | 456 | 365 | 259 |
| 200% Modulus @ 100° C. (MPa): | 3.27 | 2.73 | 3.91 | 4.06 |
| Tensile Break Stress @ 100° C. (MPa): | 5.04 | 5.19 | 5.67 | 5.64 |
| Elongation at Break @ 100° C. (%): | 268 | 304 | 291 | 290 |
| tan δ [torsion strip; 0° C.; 5 Hz, 2%]: | 0.309 | 0.284 | 0.241 | 0.191 |
| tan δ [torsion strip; 50° C.; 5 Hz, 2%]: | 0.225 | 0.176 | 0.131 | 0.147 |
| G'(MPa) [torsion strip; 50° C.; 5 Hz, 2%]: | 3.71 | 4.43 | 7.41 | 18.44 |
| ΔG' (MPa) [torsion button; 50° C.; 1 Hz; 0.25%–14.75%]: | 1.95 | 0.44 | 1.39 | 6.01 |
| tan δ [torsion button; 50° C.; 1 Hz, 5%]: | 0.209 | 0.105 | 0.100 | 0.157 |

Experiment 3

Two additional block copolymers were prepared in a similar fashion to the polymers described in Experiments 1 and 2 except that the styrene was polymerized first followed by the elastomeric segment. Sample 13 included a block copolymer including a random poly(styrene-co-butadiene) segment and a polystyrene segment. The polymerization of this block copolymer was terminated with isopropyl alcohol in a similar fashion to those polymers prepared in Experiments 1 and 2. Sample 14 likewise included a block copolymer that included a random poly(styrene-co-butadiene) segment and a polystyrene segment. This block copolymer, however, was terminated with dimethylimidazolidinone (DMI), and therefore was attached to the elastomeric block. Specifically, about 0.9 equivalents of DMI per equivalent of lithium in the initiator was charged to the living polymer cement about 1 hour after peak polymerization exotherm.

Following termination, the polymer cement was blended with about 15 parts by weight black oil per 100 parts weight rubber and drum dried.

Table III provides the defining ingredients employed in preparing the polymers, the key characteristics of the polymer, and the mechanical and dynamic properties that were observed from tests performed on vulcanizates prepared using the polymer. The formulations employed in preparing the vulcanizates were similar to those of Experiments 1 and 2, except that the formulation included about 10.5 parts by weight per 100 parts by weight rubber of a black oil.

TABLE III

|  | Stock No.: | |
| --- | --- | --- |
|  | Sample 13 | Sample 14 |
| Polymer: | PS-b-SBR-H | PS-b-SBR-DMI |
| Initiator: | BuLi | BuLi |
| Terminator: | IPA | DMI |
| PS block (kg/mol): | ~12 | ~12 |
| $M_n$ (kg/mol): | 185 | 189 |
| $T_g$ (° C.) | −44.8 | −44.8 |
| $ML_{1+4}$ @ 100° C.: | 70 | 74.3 |
| Compound Properties | | |
| $ML_{1+4}$ @ 130° C.: | 45.0 | 49.2 |
| 171° C. MDR $TC_{50}$ (min): | 2.65 | 2.49 |
| Surfanalyzer D.I.: | 96.0 | 97.8 |
| RING TENSILE (23° C.) | | |
| 50% Modulus (MPa): | 1.14 | 1.23 |
| 300% Modulus (MPa): | 8.13 | 9.56 |
| Tensile Strength (MPa): | 18.6 | 21.4 |
| Elongation (%): | 525.2 | 517.2 |
| tan δ @ 0° C., 0.5%: | 0.2144 | 0.2306 |
| tan δ @ 50° C., 2%: | 0.1600 | 0.1286 |
| tan δ @ 50° C., 5%: | 0.1484 | 0.1044 |
| ΔG' @ 50° C. (MPa): 0.25–14.25% | 1.150 | 0.425 |

Experiment 4

Three additional polymer samples were prepared. The first sample, which is designated Sample 15, was a block copolymer of including a first segment that included a random styrene-butadiene rubber, a second segment that included polystyrene, and a functional group attached to the polystyrene block. The functional group included a tributyl tin functionality. The second polymer, designated Sample 16, was a similar block copolymer including a random styrene-butadiene block and a polystyrene block without the functional group. The third polymer, which is designated Sample 17, included a random styrene-butadiene rubber having a functional group attached thereto. The functional group included a tributyl tin functionality. This third polymer did not include a polystyrene block.

The first polymer (Sample 15) was prepared as follows. To a 2-gallon reactor equipped with turbine agitator blades was added 1.42 kg hexane, 0.41 kg 32.8 wt % styrene in hexane, and 2.61 kg 20.9 wt % butadiene in hexane. To the reactor was charged 3.68 ml of 1.68 M butyl lithium in hexane and 1.42 ml of 1.6 M 2,2'-di(tetrahydrofuryl)propane in hexane and the batch temperature was controlled at 49° C. After approximately 1 hour, 0.19 kg of 32.8 wt % styrene in hexane was added to the reactor. After an additional 30 minutes, 0.02 kg of 20.9 wt % butadiene in hexane was added to the reactor. Ten minutes later, 6.19 ml of 1.0M tributyltin chloride was added. After 75 minutes, the contents of the reactor were discharged into isopropanol containing antioxidant and the polymer drum dried. The isolated polymer had the following properties: $M_n$=121 kg/mol, $M_w$=127 kg/mol, $T_g$=−34.6° C., % styrene=26.9, % block styrene=9.4, % 1,2 butadiene=39.3 (BD=100%).

The second polymer (Sample 16) was prepared as follows. To a 2-gallon reactor equipped with turbine agitator blades was added 1.42 kg hexane, 0.41 kg 32.8 wt % styrene in hexane, and 2.61 kg 20.9 wt % butadiene in hexane. To the reactor was charged 3.68 ml of 1.68 M butyl lithium in hexane and 1.42 ml of 1.6 M 2,2'-di(tetrahydrofuryl)propane in hexane and the batch temperature was controlled at 49° C. After approximately 1 hour, 0.19 kg of 32.8 wt % styrene in hexane was added to the reactor. After an additional 30 minutes, 0.02 kg of 20.9 wt % butadiene in hexane was added to the reactor. Ten minutes later, the contents of the reactor were discharged into isopropanol containing antioxidant and the polymer drum dried. The isolated polymer had the following properties: $M_n$=131 kg/mol, $M_w$=137 kg/mol, $T_g$=−40.9° C., % styrene=24.6, % block styrene=6.9, % 1,2 butadiene=50.0 (BD=100%).

The third polymer (Sample 17) was prepared as follows. To a 5-gallon reactor equipped with turbine agitator blades was added 4.85 kg hexane, 1.25 kg 32.8 wt % styrene in hexane, and 7.44 kg 22.0 wt % butadiene in hexane. To the reactor was charged 1.0 ml of 1.68 M butyl lithium in hexane, 16.23 ml of 0.588 M tributyltinlithium in tetrahydrofuran, and 2.48 ml of 1.6 M 2,2'-di(tetrahydrofuryl) propane in hexane at 15.6° C. The batch temperature was controlled at 48.9° C. Once the batch temperature reached 50° C., the jacket was flooded with cold water. After approximately 3 hours, the contents of the reactor were discharged into isopropanol containing antioxidant and the polymer drum dried. The isolated polymer had the following properties: $M_n$=149 kg/mol, $M_w$=159 kg/mol, $T_g$=−36.0° C.

Portions of Samples 15, 16, and 17 were added to tire formulations that were similar to those employed in Experiment 1 except that aliphatic oil was used in lieu of aromatic oil. The formulations were also mixed, extruded and cured in a similar fashion and mechanical and dynamic testing was performed on the resulting vulcanizates. The results of this testing, along with some of the characteristics of the polymer, are provided in Table IV.

TABLE IV

|  | Example: | | |
| --- | --- | --- | --- |
|  | 15 | 16 | 17 |
| Polymer type: | SBR-b-PS-TBT | SBR-b-PS | TBT-SBR |
| Polystyrene block (Kg/mol) | 10 | 10 | 0 |
| $M_n$ (kg/mol): | 121 | 131 | 149 |
| $M_w/M_n$: | 1.05 | 1.04 | 1.07 |
| $T_g$ (° C.): | −34.6 | −40.9 | −36.0 |
| 171° C. MDR t50 (min): | 3.9 | 4.2 | 3.3 |
| 171° C. MH–ML (Kg-cm): | 10.21 | 10.51 | 13.79 |
| $ML_{1+4}$ @ 100° C.: | 22.1 | 33.0 | 26.3 |
| 300% Mod. @ 23° C. (MPa): | 8.63 | 8.25 | 8.36 |
| Tensile Break Stress @ 23° C. MPa): | 16.91 | 15.99 | 7.40 |
| 200% Modulus @ 100° C. (MPa): | 2.62 | 2.67 | 3.94 |
| Tensile Break Stress @ 100° C. (MPa): | 4.70 | 5.06 | 4.44 |
| TB · EB @ 100° C. (MPa · %) | 1259 | 1505 | 950 |
| T Sweep 0° C. (2%, 5 Hz) tan δ: | 0.245 | 0.205 | 0.228 |
| T Sweep 50° C. (2%, 5 Hz) tan δ: | 0.084 | 0.150 | 0.106 |
| 50° C. RDA 0.25–14% DG' (MPa): | 0.160 | 0.516 | 0.221 |
| 50° C. Strain Sw. (5%, 1 Hz) tan δ: | 0.078 | 0.132 | 0.103 |

Portions of Samples 15, 16, and 17 were also added to separate tire formulations that did not include any curative. Otherwise, the formulations were similar to those employed in Experiment 1. These tire formulations were then subjected to annealing at 171° C. for various time intervals.

Figure 1:
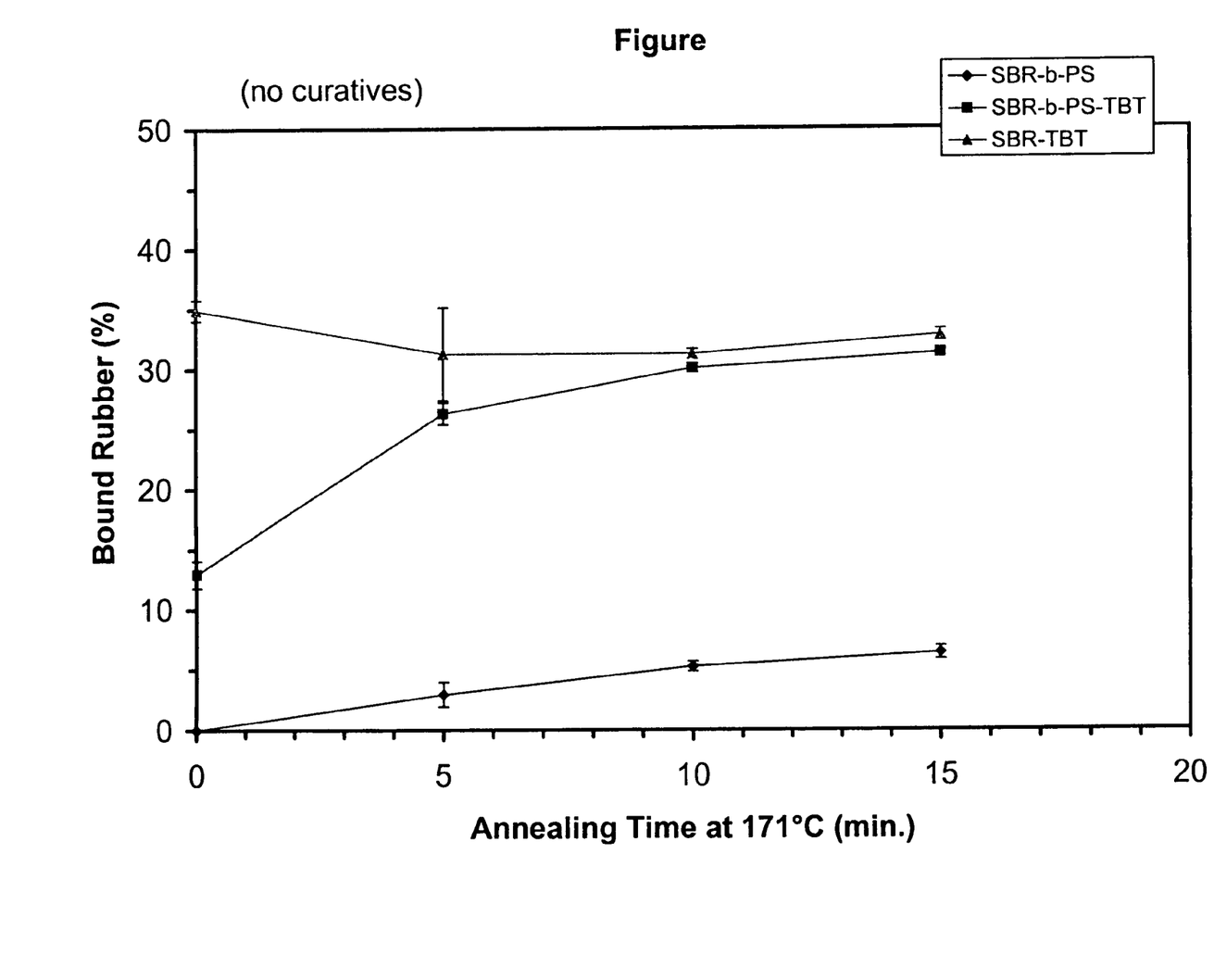
The FIGURE is a graph demonstrating the delayed reaction between functional group and filler that occurs with certain embodiments of this invention.

Following each of these intervals, samples of the respective tire formulations were analyzed for bound rubber content. The resulting data from these tests is provided in Table V. The bound rubber results were plotted versus the annealing time, and the resulting graph is provided as FIG. 1, which evidences a delayed reaction between the functional group and filler for Sample 15 as compared to Sample 17.

TABLE V

| Time (min.) | Example | | |
| --- | --- | --- | --- |
|  | 15 | 16 | 17 |
| 0 | 14.41 | 0 | 33.50 |
| 5 | 25.39 | 3.46 | 21.90 |
| 10 | 30.69 | 5.82 | 31.81 |
| 15 | 31.43 | 5.45 | 32.50 |

Various modifications and alterations that do not depart from the scope and spirit of this invention will become apparent to those skilled in the art. This invention is not to be duly limited to the illustrative embodiments set forth herein.

What is claimed is:

1. A tire comprising:
   A tire component including a vulcanized rubber; and
   from about 3 to about 85 parts by weight, per 100 parts by weight rubber, of a filler dispersed within said vulcanized rubber,
   where the vulcanized rubber includes the vulcanized residue of a thermoplastic-elastomeric block copolymer defined by the formula $\alpha$-$\pi$-$\theta$-$\omega$ where $\alpha$ is a hydrogen atom or a functional group, $\pi$ includes an elastomeric block, $\theta$ includes a thermoplastic block, and $\omega$ includes a hydrogen atom or a functional group.

2. The tire of claim 1, where said elastomeric block is characterized by a glass transition temperature of less than about 0° C.

3. The tire of claim 1, where said elastomeric block is characterized by a glass transition temperature of less than about −20° C.

4. The tire of claim 1, where said thermoplastic block is characterized by a softening temperature that is greater than about 70° C.

5. The tire of claim 1, where said thermoplastic block is characterized by a softening temperature that is greater than about 80° C.

6. The tire of claim 1, where said elastomeric block includes a homopolymer or random copolymer including units deriving from the polymerization of at least one conjugated diene.

7. The tire of claim 6, where said elastomeric block includes a random copolymer of 1,3-butadiene and styrene, and where the units deriving from 1,3-butadiene are characterized by including about 8 to about 70% units in the 1,2 configuration.

8. The tire of claim 1, where said thermoplastic block includes a homopolymer of styrene.

9. The tire of claim 1, where the tire component further includes poly(2,6-dimethyl-1,4-phenyleneoxide).

10. The tire of claim 7, where the random copolymer includes less than 40% by weight units from styrene.

11. The tire of claim 1, where $\alpha$ includes a functional group that will react or interact with rubber or rubber fillers.

12. The tire of claim 11, where said functional group includes a trialkyltin group, a cyclic amine, or a sulfur-containing heterocycle.

13. The tire of claim 1, where said tire component includes from about 12 to about 50 parts by weight filler per 100 parts by weight rubber.

14. The tire of claim 1, where said extender oil includes a paraffinic oil.

15. The tire of claim 11, where said filler includes carbon black, silica, or both carbon black and silica.

16. The tire of claim 1, where said vulcanized rubber includes greater than 30% by weight of the vulcanized residue resulting from the thermoplastic-elastomeric block copolymer.

17. The tire of claim 16, where said vulcanized rubber includes greater than 50% by weight of the vulcanized residue resulting from the thermoplastic-elastomeric block copolymer.

18. The tire of claim 1, where the tire component includes a tire tread.

19. A tire comprising:
   a tire component including a vulcanized rubber; and
   a filler dispersed within said vulcanized rubber,
   where the vulcanized rubber includes the vulcanized residue of a thermoplastic-elastomeric block copolymer that includes at least one elastomeric block and at least one thermoplastic block, where the elastomeric block is characterized by a number average molecular weight that is greater than about 10 kg/mol.

20. The tire of claim 19, where said thermoplastic-elastomeric block copolymer further includes a functional group.

21. A functional block copolymer defined by the formula $\alpha$-$\pi$-$\theta$-$\omega$ where $\alpha$ is a hydrogen atom or a functional group, $\pi$ is an elastomeric block, $\theta$ is a thermoplastic block, and $\omega$ is a hydrogen atom or a functional group with the proviso that at least one of said $\alpha$ or said $\omega$ includes a functional group.

22. The functional block copolymer of claim 21, where both $\alpha$ and $\omega$ include a functional group.

23. The tire of claim 1, where the tire component includes a tire tread.

24. The tire of claim 1, where the vulcanized rubber further includes the vulcanized residue of a rubber selected from the group consisting of polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof.

25. The tire of claim 1, where $\omega$ is a functional group that will react or interact with rubber or rubber filler.

26. The tire of claim 25, where said filler includes carbon black, silica, or both carbon black and silica.

* * * * *